US012365064B2

(12) United States Patent
Raman et al.

(10) Patent No.: US 12,365,064 B2
(45) Date of Patent: Jul. 22, 2025

(54) SCREW GUN APPARATUS FOR SEMI-AUTOMATED SHEETROCK SYSTEM

(71) Applicant: RevolutioNice Inc., Belleville, NJ (US)

(72) Inventors: Sreenivas Raman, Park Ridge, NJ (US); William Tompkins, West Nyack, NY (US); Stephen Joseph Churchman, Hoboken, NJ (US); Condoor Lakshmi Punith Kumar, Bloomfield, NJ (US); Huaguang Du, Hoboken, NJ (US)

(73) Assignee: RevolutioNice Inc., Belleville, NJ (US)

( * ) Notice: Subject to any disclaimer, the term of this patent is extended or adjusted under 35 U.S.C. 154(b) by 422 days.

(21) Appl. No.: 18/072,361

(22) Filed: Nov. 30, 2022

(65) Prior Publication Data

US 2023/0166386 A1 Jun. 1, 2023

Related U.S. Application Data

(60) Provisional application No. 63/284,054, filed on Nov. 30, 2021.

(51) Int. Cl.
*B25B 21/00* (2006.01)
*B66F 11/04* (2006.01)

(52) U.S. Cl.
CPC .......... *B25B 21/002* (2013.01); *B66F 11/042* (2013.01)

(58) Field of Classification Search
CPC ............................. B25B 21/002; B66F 11/042
See application file for complete search history.

(56) References Cited

U.S. PATENT DOCUMENTS

| | | | | |
|---|---|---|---|---|
| 5,413,454 | A | 5/1995 | Movsesian | |
| 5,602,967 | A | 2/1997 | Pryor | |
| 9,352,435 | B2 | 5/2016 | Spishak et al. | |
| 9,427,874 | B1 | 8/2016 | Rublee | |
| 9,720,414 | B1 | 8/2017 | Theobald | |
| 2004/0240981 | A1* | 12/2004 | Dothan .................. | B65G 61/00 414/795.4 |
| 2011/0264306 | A1 | 10/2011 | Bagge | |

(Continued)

FOREIGN PATENT DOCUMENTS

| | | |
|---|---|---|
| CA | 2716134 | 3/2012 |
| CN | 204920253 | 12/2015 |

(Continued)

OTHER PUBLICATIONS

International Search Report, dated Oct. 27, 2016, from corresponding International Application No. PCT/US2016/00049.

(Continued)

*Primary Examiner* — Michelle Lopez
(74) *Attorney, Agent, or Firm* — Thomas | Horstemeyer, LLP

(57) ABSTRACT

In particular embodiments, a sheetrock robot may be an autonomous (or semi-autonomous) system comprising a drive base, lift assembly, load Manipulator, and screw gun assembly. In particular embodiments, the sheetrock robot's functions may include, for example: (1) taking a piece of sheetrock off of a stack; (2) picking it up and transporting it to a desired location; (3) lifting and manipulating it into position using the load manipulator; (4) detecting studs; and (5) attaching it to a studded wall with sheetrock screws.

9 Claims, 12 Drawing Sheets

(56) References Cited

U.S. PATENT DOCUMENTS

| | | | |
|---|---|---|---|
| 2012/0279142 A1 | 11/2012 | Michaud | |
| 2013/0011234 A1 | 1/2013 | Pretlove et al. | |
| 2013/0119033 A1 | 5/2013 | Lipnevicius | |
| 2015/0050111 A1 | 2/2015 | Townsend | |
| 2016/0320765 A1 | 11/2016 | Carberry et al. | |
| 2017/0114553 A1* | 4/2017 | Raman | B25J 5/007 |
| 2019/0283841 A1* | 9/2019 | Farrell, III | B63C 11/52 |
| 2020/0016619 A1* | 1/2020 | Raman | G05D 1/0234 |
| 2021/0310263 A1* | 10/2021 | Zhang | B25J 9/1697 |

FOREIGN PATENT DOCUMENTS

| | | | |
|---|---|---|---|
| JP | 2808019 | 10/1998 | |
| WO | 2013112907 | 8/2013 | |
| WO | WO-2016066615 A2 * | 5/2016 | B08B 15/04 |

OTHER PUBLICATIONS

Notice of Allowance, dated Feb. 1, 2018, from corresponding U.S. Appl. No. 15/178,563.
Office Action, dated Sep. 22, 2017, from corresponding U.S. Appl. No. 15/178,563.
Written Opinion of the International Searching Authority, dated Oct. 27, 2016, from corresponding International Application No. PCT/US2016/00049.

* cited by examiner

100

SCREW GUN APPARATUS FOR SEMI-AUTOMATED SHEETROCK SYSTEM

CROSS REFERENCE TO RELATED APPLICATIONS

This application claims priority to U.S. Provisional Patent Application Ser. No. 63/284,054, filed Nov. 30, 2021, the disclosure of which is hereby incorporated herein by reference in its entirety.

BACKGROUND

Sheetrock (Gypsum board, wall-board, drywall) is the most commonly used material for walls & ceilings in homes, offices, and commercial buildings. Sheetrock is used to quickly create surfaces for building interiors.

However, sheetrock is heavy, comes in hard to handle sizes, and requires multiple workers often using stilts, ladders, scaffolds, and lifts to attach this material. It is not uncommon to find sheetrock being installed in lengths as long as 16 feet, with thicknesses of ¾ of an inch. A standard board of sheetrock weighs about 70 pounds, with fire rated material weighing as much as 150 pounds.

Due to the unmanageable sizes & weights of this material workers often suffer from injuries due to falls, strains, and repetitive task ailments. Lung and respiratory problems are also commonplace for workers who are in close contact with the sheetrock's dust.

One of the biggest problems plaguing the construction industry today is the lack of skilled laborers. There are simply not enough workers. Sheetrock crews usually work in teams of 3 or 4 people, with commercial worksites having 5 or 6 teams working at one time. This lack of manpower may slowly start to stagnate the industry.

Another problem with handling these large, heavy sheetrock boards is fastening them to the studs. A standard 4 foot by 8 foot sheetrock board could have as many as, but not limited to, 32 screws. Larger sized boards, fire rated, commercial, and sheetrock hung from ceilings could have even more. Applying fasteners (screws) while manipulating these heavy loads is tedious, tiring and dangerous.

While placing the sheetrock takes considerable time, it is the application of the fasteners which slows the sheetrocking process. Most of the time spent hanging sheetrock is due to fastening it to the studs. This process ties up a worker for as long as 5 minutes per board.

Additional time is lost with the worker having to move from location to location to apply the fasteners. This requires moving ladders, repositioning scaffolds, and/or bending or stretching to reach desired positions.

Another challenge in the sheetrock hanging process is finding the studs to attach the sheetrock to. In typical applications, a stud is positioned on 16 inch centers. However, studs may be located as far as 24 inches away, or strategically placed around stack-pipes, wiring chases, or adjoining framing.

SUMMARY

A screw-gun apparatus, in various embodiments, comprises: (1) a lift assembly; (2) a load manipulator disposed on the lift assembly, the load manipulator comprising a hexapod manipulator comprising at least one suction cup; (3) a vacuum system in communication with the at least one suction cup; and (4) a screw gun disposed above load manipulator on the lift assembly, the screw gun comprising two compression springs disposed on opposing sides of the screw gun, the two compression springs being configured to apply a constant pressure between the screw gun and a wall stud as the screw gun screws a screw into the wall stud. In various embodiments: (1) the lift assembly is configured to adjust a vertical position of the screw gun and the load manipulator; (2) the vacuum system is configured to cause the at least one suction cup to hold and maintain a piece of sheet rock as the screw gun screws the screw through the piece of sheet rock into the wall stud; and (3) the load manipulator is configured to adjust an orientation of the piece of sheet rock while the at least one suction cup is holding the piece of sheet rock through modification of the hexapod manipulator.

In particular embodiments, the screw-gun apparatus further comprises a lateral actuator disposed on the load manipulator, the lateral actuator being configured to modify a lateral position of the screw gun relative to the hexapod manipulator. In other embodiments, the screw gun comprises a tilting mechanism configured to adjust a vertical angle of the screw gun relative to the load manipulator. In still other embodiments the screw gun comprises a rotating base configured to adjust an orientation of the screw gun relative to the load manipulator. In further embodiments, the screw gun comprises one or more slide actuators configured to adjust a distance of the screw gun from the wall stud.

In particular embodiments, the load manipulator is configured to adjust an orientation of the piece of sheetrock independent of an orientation of the screw gun. In such embodiments, the screw gun is configured to modify an orientation of the screw gun through operation of a rotation based and or lateral actuator independent of the orientation of the load manipulator

BRIEF DESCRIPTION OF THE DRAWINGS

Various embodiments of a screw-gun apparatus and semi-automated sheetrock robot are described below. In the course of this description, reference may be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. References to an element in the plural may include embodiments with one element. Likewise, references to an element in the singular may include embodiments having multiple elements.

Overview

In various embodiments a sheetrock screw gun apparatus may be incorporated into an autonomous (or semi-autonomous) sheetrock hanging robot. In particular embodiments, the screw gun apparatus may have sensors to detect contact with the sheetrock's surface, over-pressure to the tip of the screw bit, missing screw in the collated strip detection, and/or a maximum travel sensor of the screw guns mechanism. In some embodiments, the screw gun apparatus may maintain a constant pressure against the sheetrock and wall through a pair of springs which engage as the screw bit makes contact with the sheetrock. In particular aspects, the screw gun apparatus may control the depth of the screw by using a mechanical adjustment located on the screw gun mechanism which may be configured to be adjusted by a worker, or automatically.

In particular embodiments, the screw gun apparatus may control screw bit rotational speed and thrust travel speed using an electronic controller, which can be altered by the worker. In some aspects, the screw gun may have the ability to handle industry standard collated screw strips, and may be able to detect and advance through missing screws in the strip.

In particular embodiments, the sheetrock robot may be an autonomous (or semi-autonomous) system comprising a drive base, lift assembly, load Manipulator, and screw gun assembly. In particular embodiments, the sheetrock robot's functions may include, for example: (1) taking a piece of sheetrock off of a stack; (2) picking it up and transporting it to a desired location; (3) lifting and manipulating it into position; (4) detecting studs; and (5) attaching it to a studded wall with sheetrock screws. The platform may be battery operated, with options for AC wall power if continuous use is needed. An operator/worker may communicate and/or control the robot via a wireless link.

Sheetrock Robot and Screw Gun Apparatus

Figure 1:
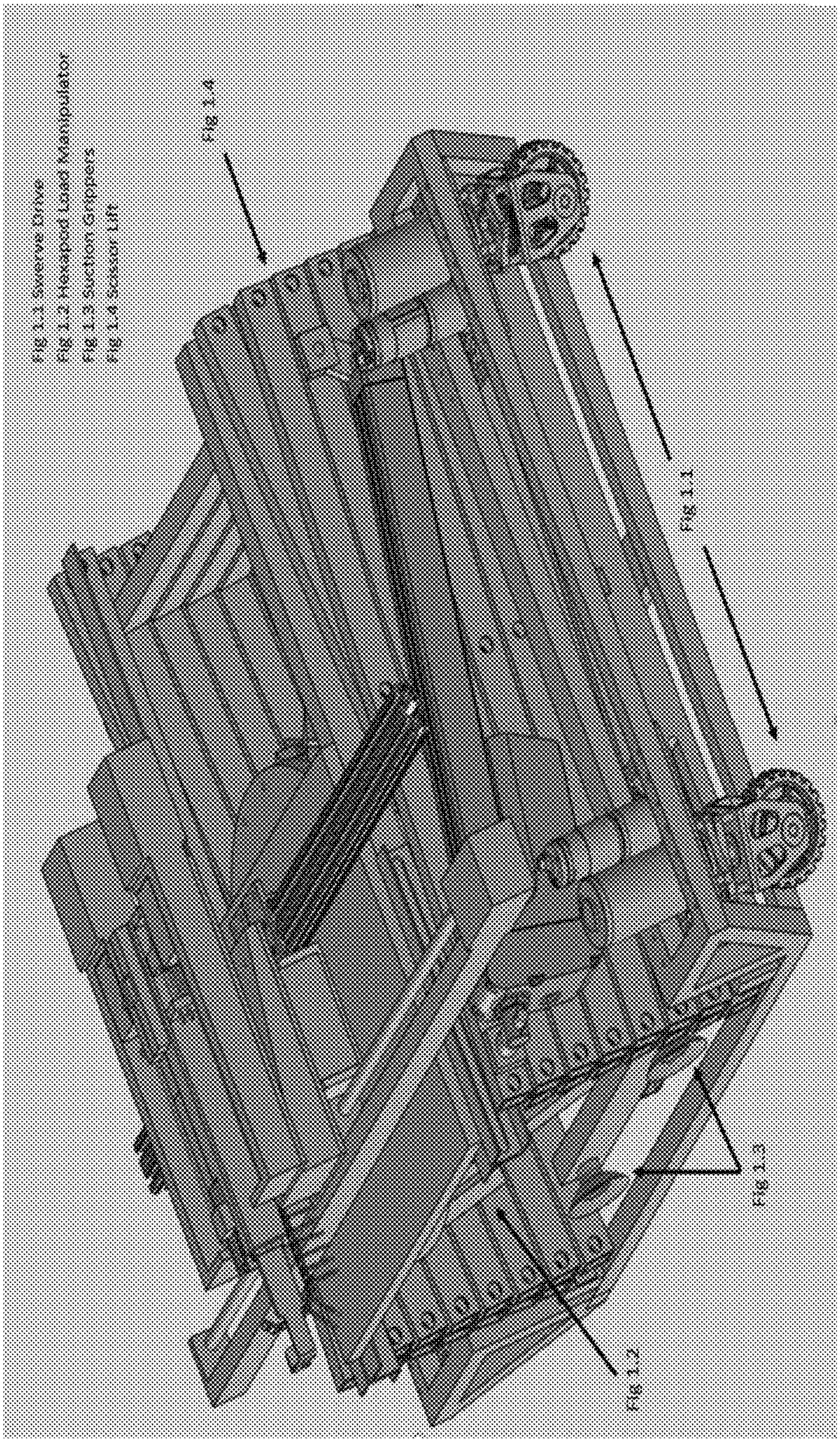
FIG. 1 depicts a semi-automated sheetrock robot with a screw-gun apparatus according to a particular embodiment.

FIG. 1 depicts a sheetrock robot with screw gun apparatus. As may be understood from the figures, the sheetrock robot with screw gun apparatus comprises a drive base. In various embodiments, the drive base may comprise four swerve drive wheel assemblies. Each swerve assembly may have the ability to independently turn 360 degrees, reverse direction, lock in place, and vary speed. These swerve drive assemblies may give an operator complete access to a work area being able to move forward & back, left & right, move on angles, and may have multiple pre-programmed driving configurations (slot-car, swerve, skid-steer, two or four wheel drive).

The sheetrock robot with screw gun apparatus may further comprise a lift assembly. In particular embodiments, the sheetrock robot with screw gun apparatus may include any suitable lifting assembly. In particular embodiments, the lifting assembly may include a multi-level scissor platform elevated by the use of linear (screw-gear) actuators. Screw-gear actuators may be chosen as a safety measure to prevent the scissor platform from collapsing due mechanical or power failure. The scissor platform may used to lift the sheetrock into position so it can be attached in a desired position to a studded wall.

As may be understood from the figures, a load manipulator assembly may disposed on the lifting assembly and include of a hexapod manipulator coupled to a 'T' shaped arm covered with suction cups at multiple locations. The load manipulator may give the worker the ability to move and adjust the sheetrock about all axes (e.g., independent of an orientation of the screw gun assembly described below and herein). A worker may have the ability to remotely position the sheetrock in or out, up or down, left or right, rotate clockwise or counter clockwise, pitch in or out. Suction cups, in conjunction with a vacuum pump, may used to grab the sheetrock while the scissor platform may adjust major changes in height. Minor adjusts in position may be accomplished using the load manipulator, through manipulation of the hexapod (e.g., Stewart platform).

In various embodiments, as shown in the figures, a screw gun assembly is disposed on the lift assembly above the load manipulator. In other embodiments, the screw gun may be disposed in another suitable position relative to the load assembly. In various embodiments, the screw gun may comprise a self-loading Phillips screw drive assembly which may use a standard drywall screw belt. As the screw gun is pressed into the sheetrock surface, the screw tip pushes forward into the screw strip moving and lodging the screw into the sheetrock.

In a particular embodiment, the internals of the screw gun assembly comprise a three phase BLDC (brushless DC) motor. A brushless motor may, for example, provide higher speed (15,000 RPM) and durability. In some embodiments, the screw gun speed may be reduced by a 10:1 reduction, which may higher torque at a lower 1,500 RPM speed. In some instances, to avoid damage to the screw's head, a pressure actuated shaft coupler may be included. This may, for example, keeps the drive bit stationary until it is firmly inserted and mated into the screw. Once adequate pressure is achieved, the screw drive may begin to turn.

Figure 3:
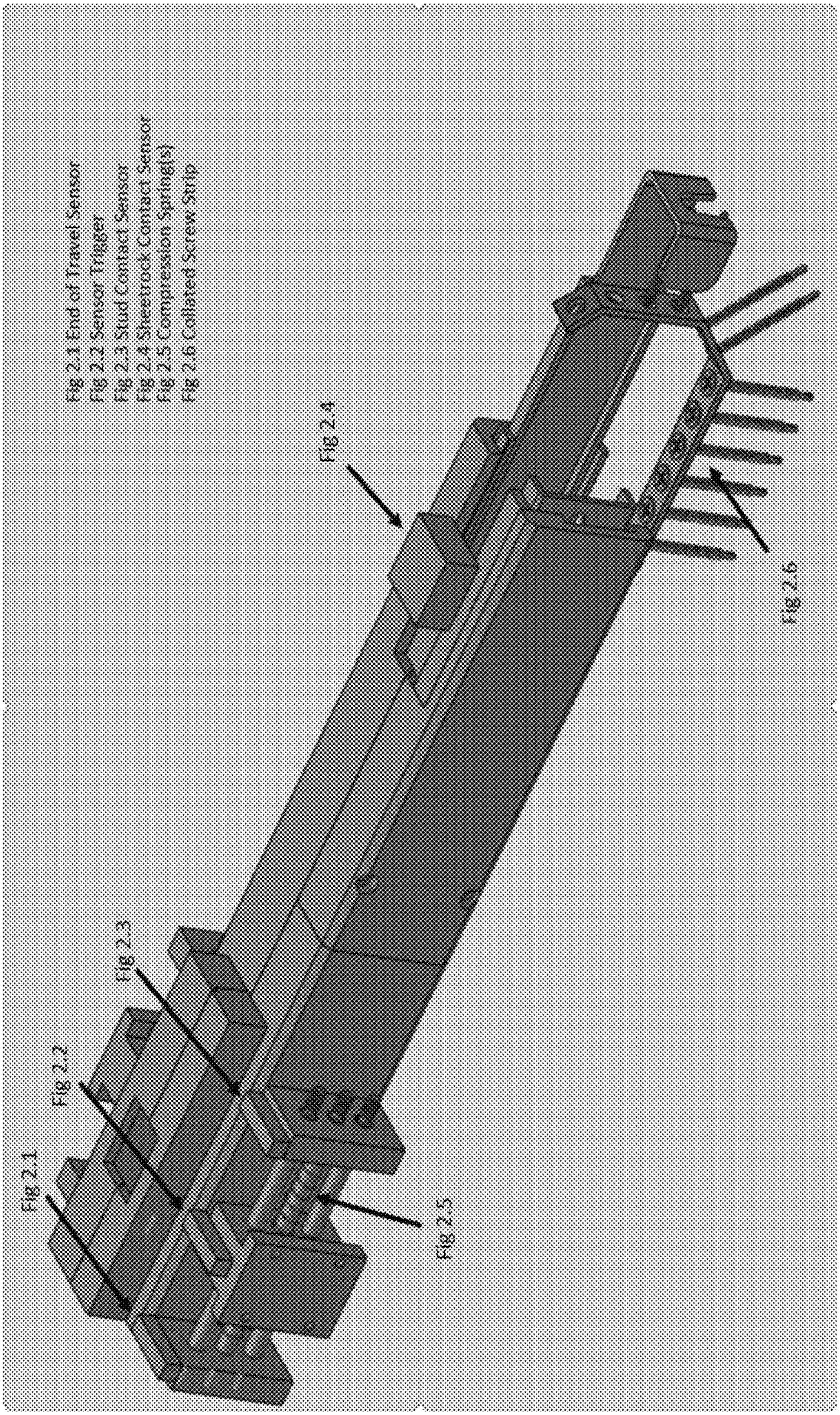
FIG. 3 depicts a detail view of a screw-gun apparatus according to various embodiments.
Figure 5:
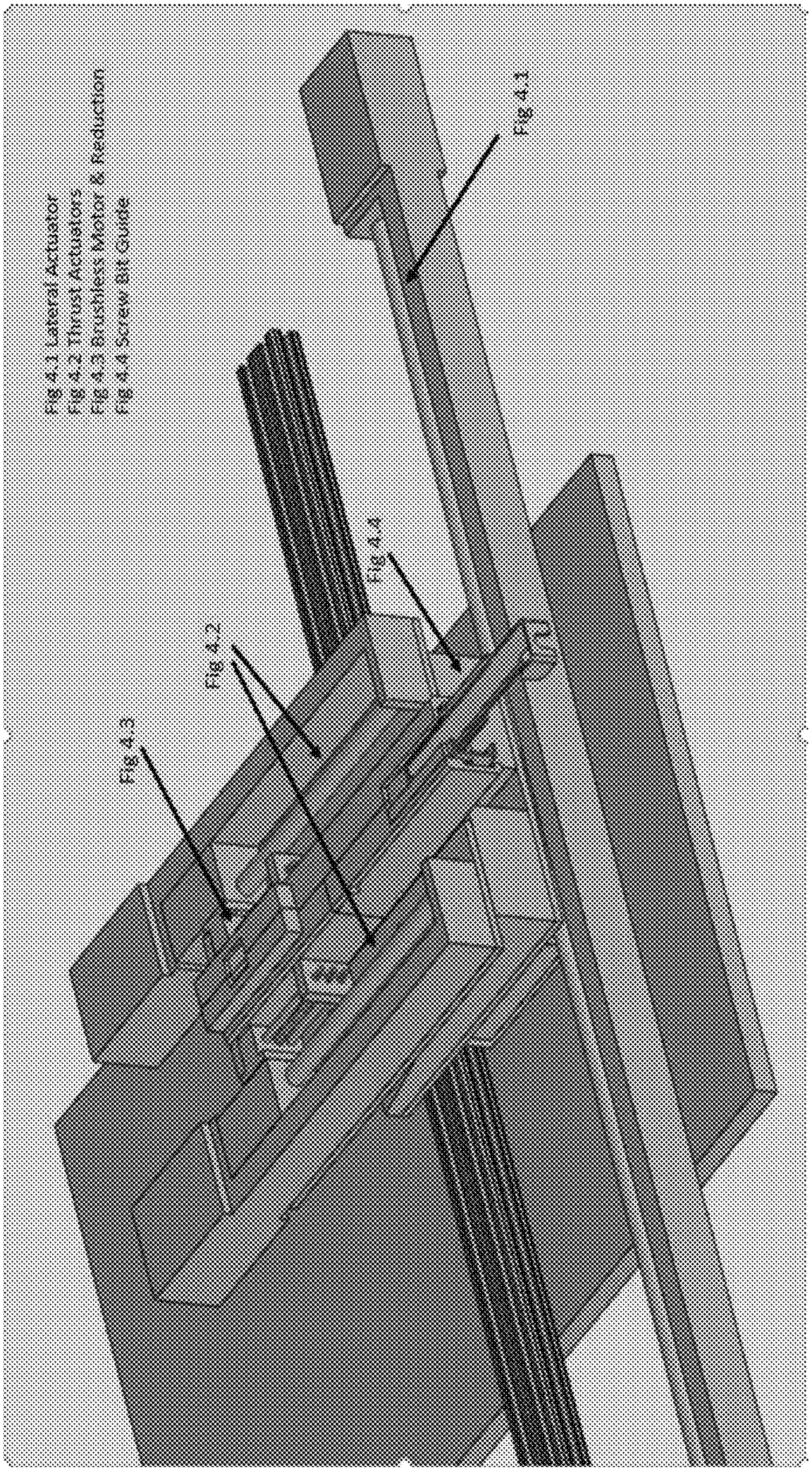
FIG. 5 depicts the screw-gun apparatus of FIG. 3 disposed on a hexapod load manipulator.
Figure 6:
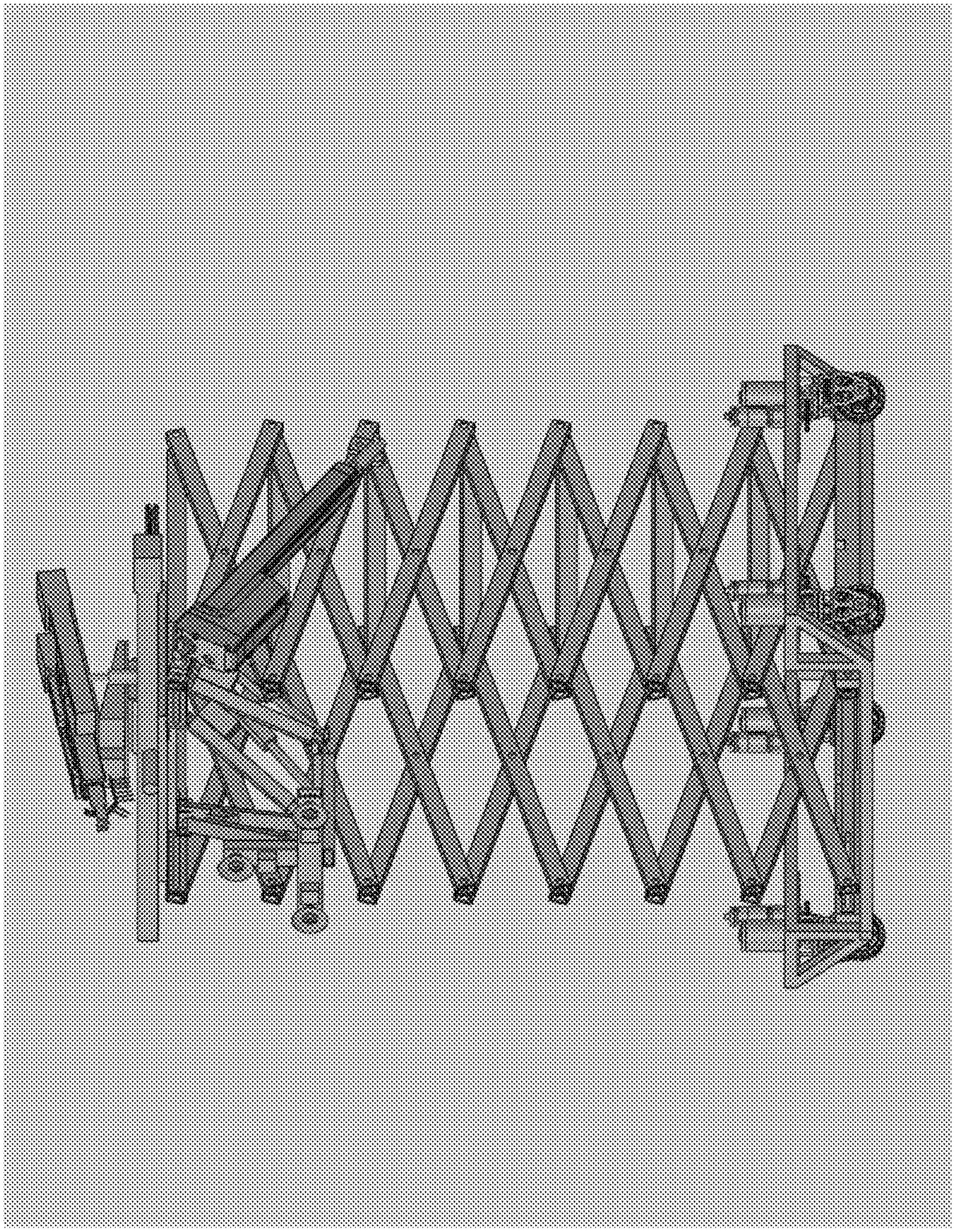
FIGS. 6-12 depict additional views of the semi-automated sheetrock robot with a screw-gun apparatus at various levels of extension and while holding a sheet of sheetrock.
Figure 7:
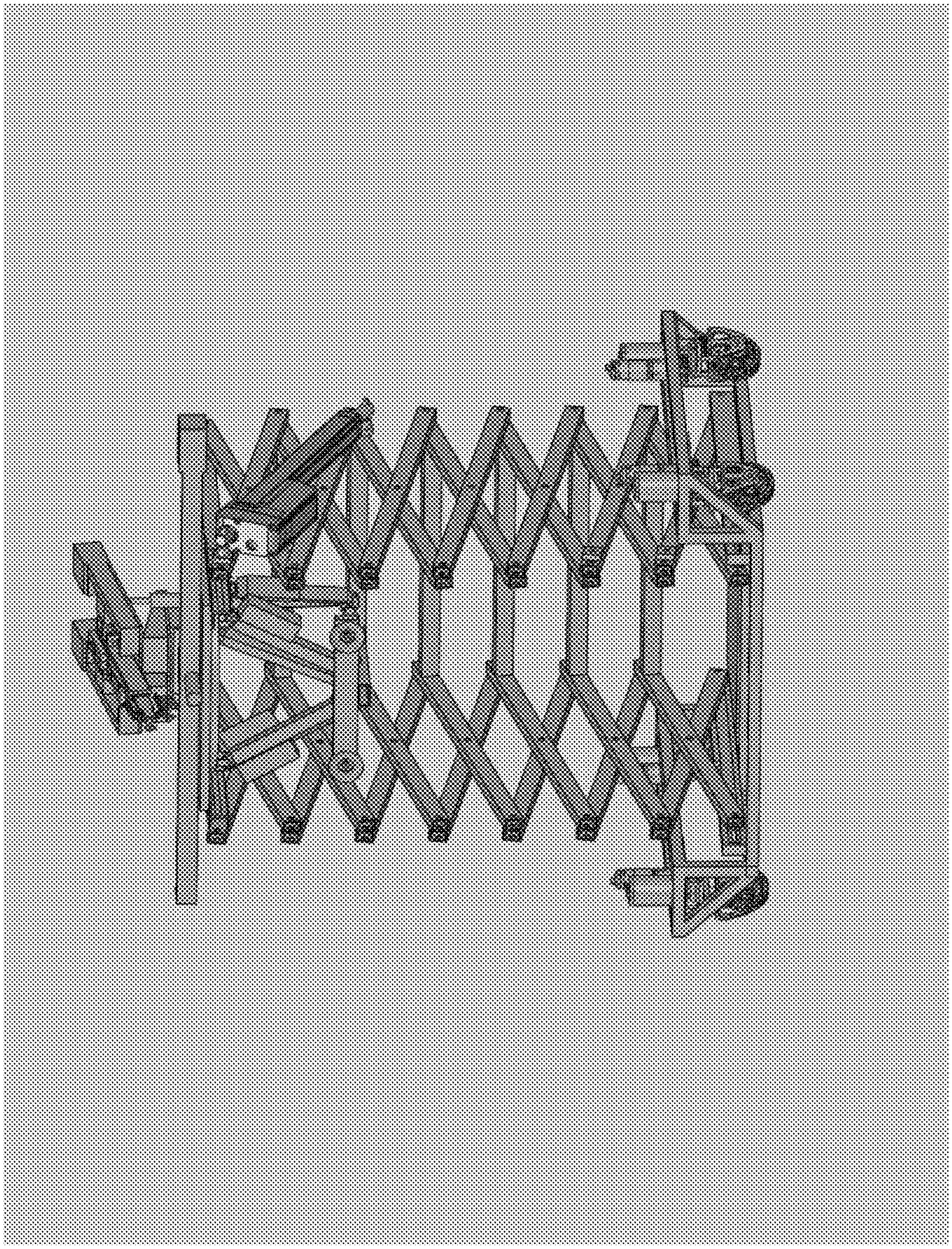
Figure 8:
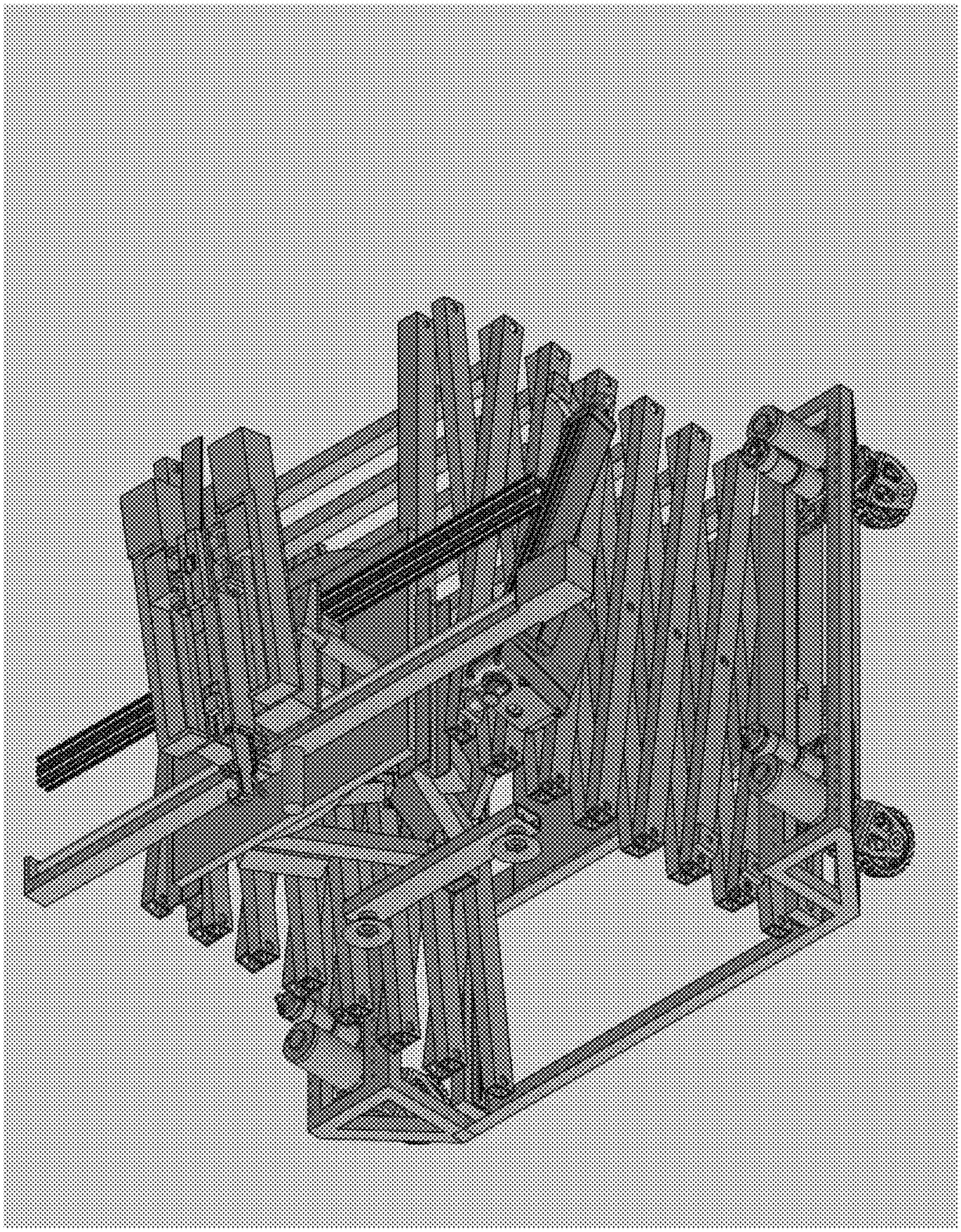
Figure 9:
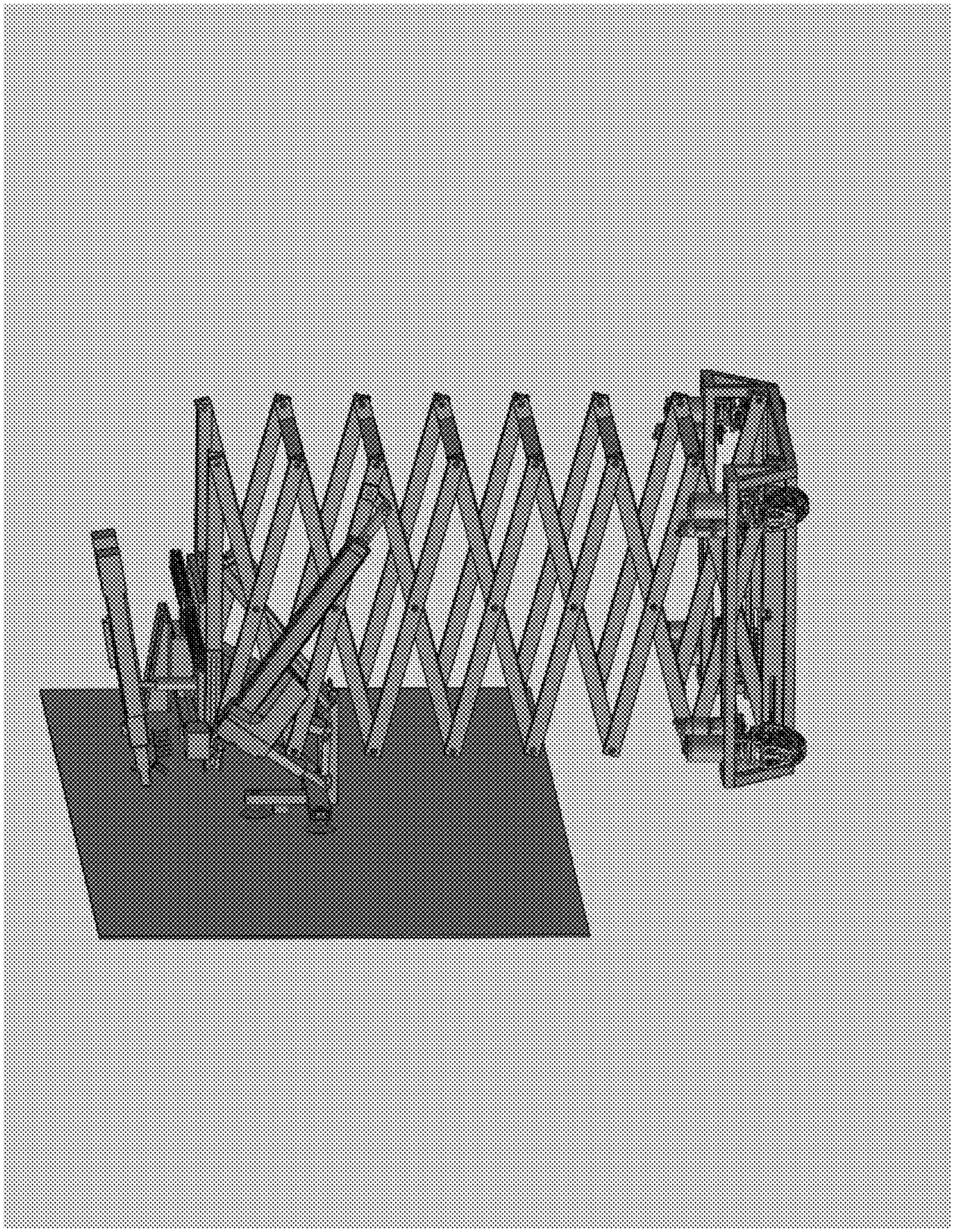
Figure 10:
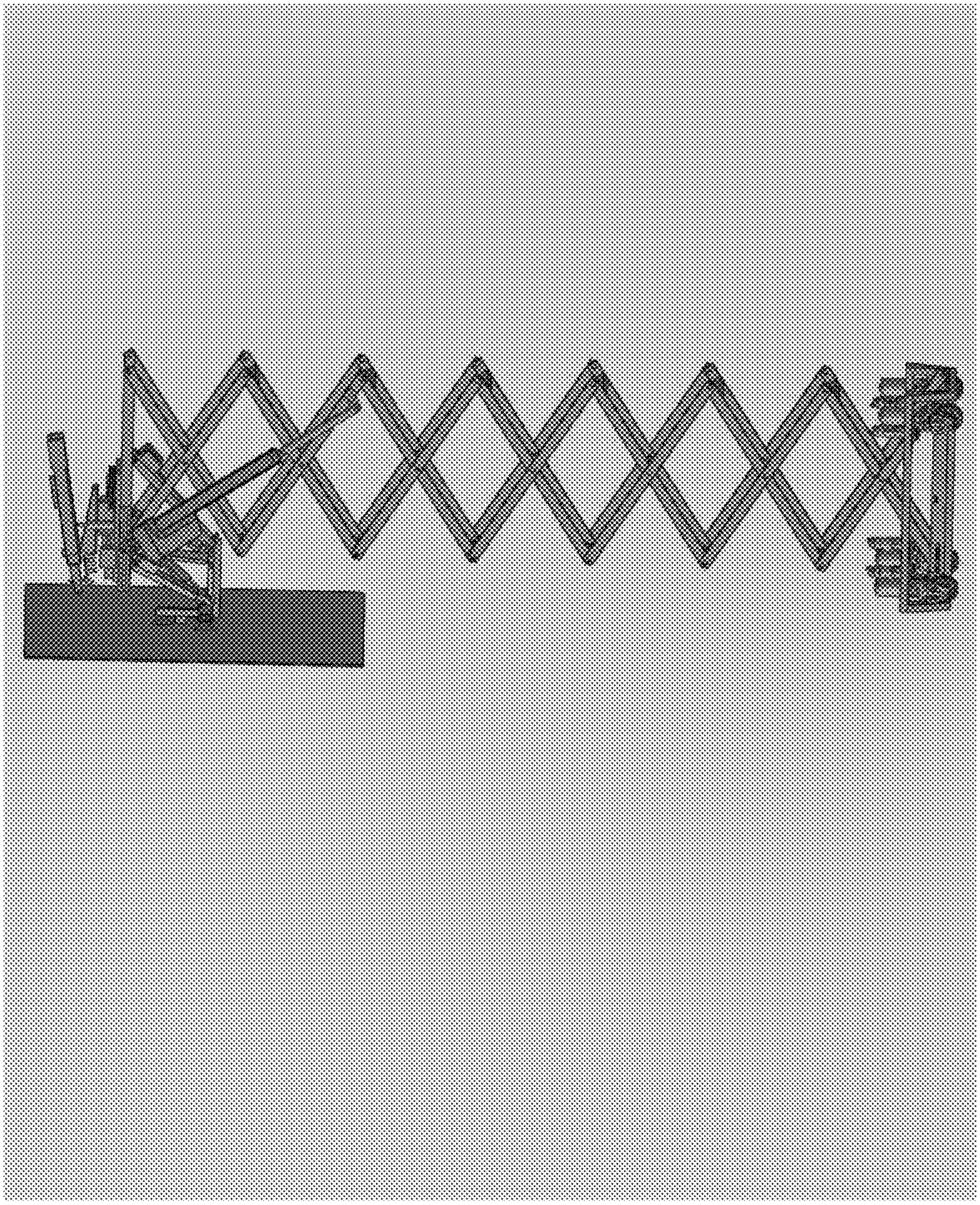
Figure 11:
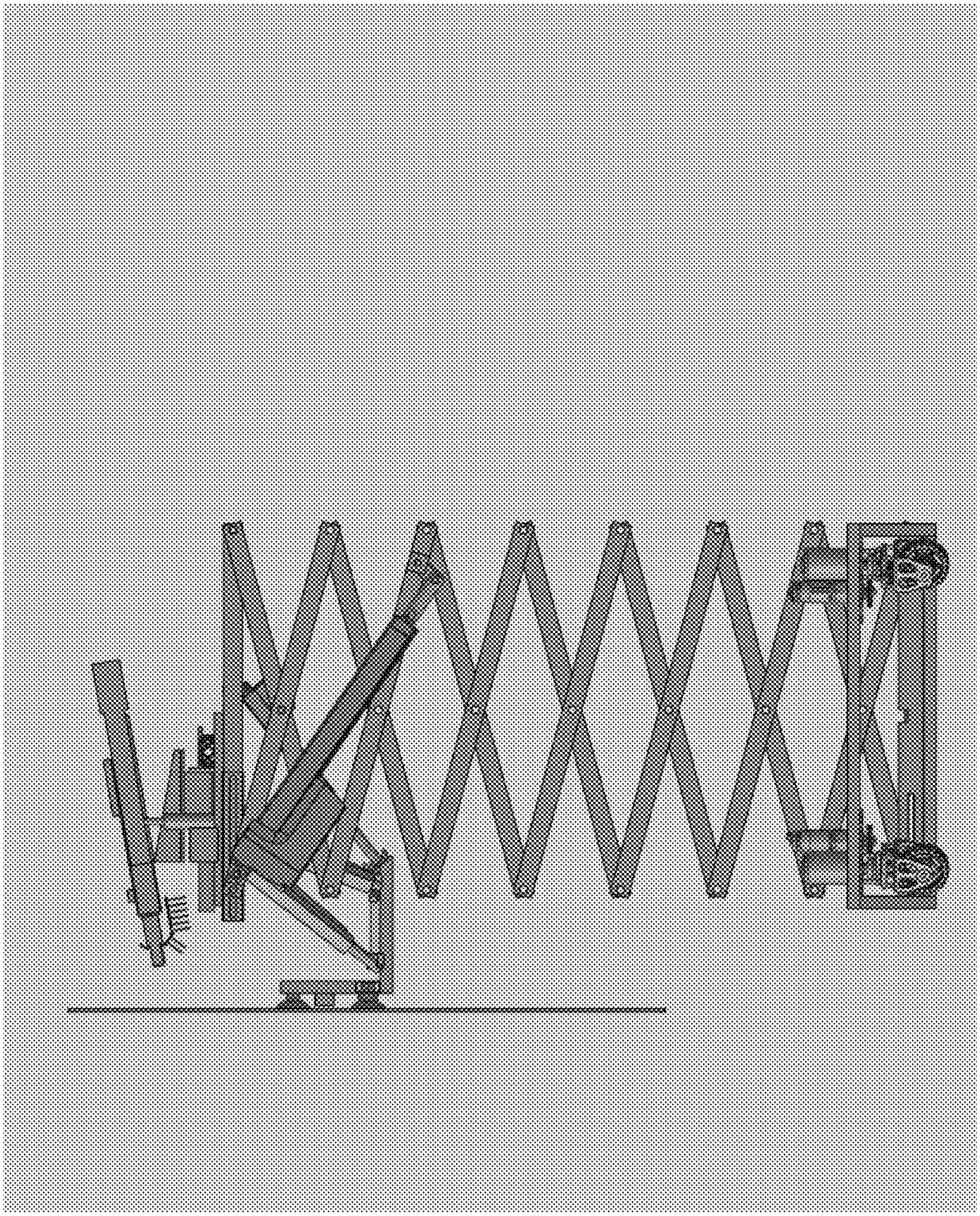
Figure 12:
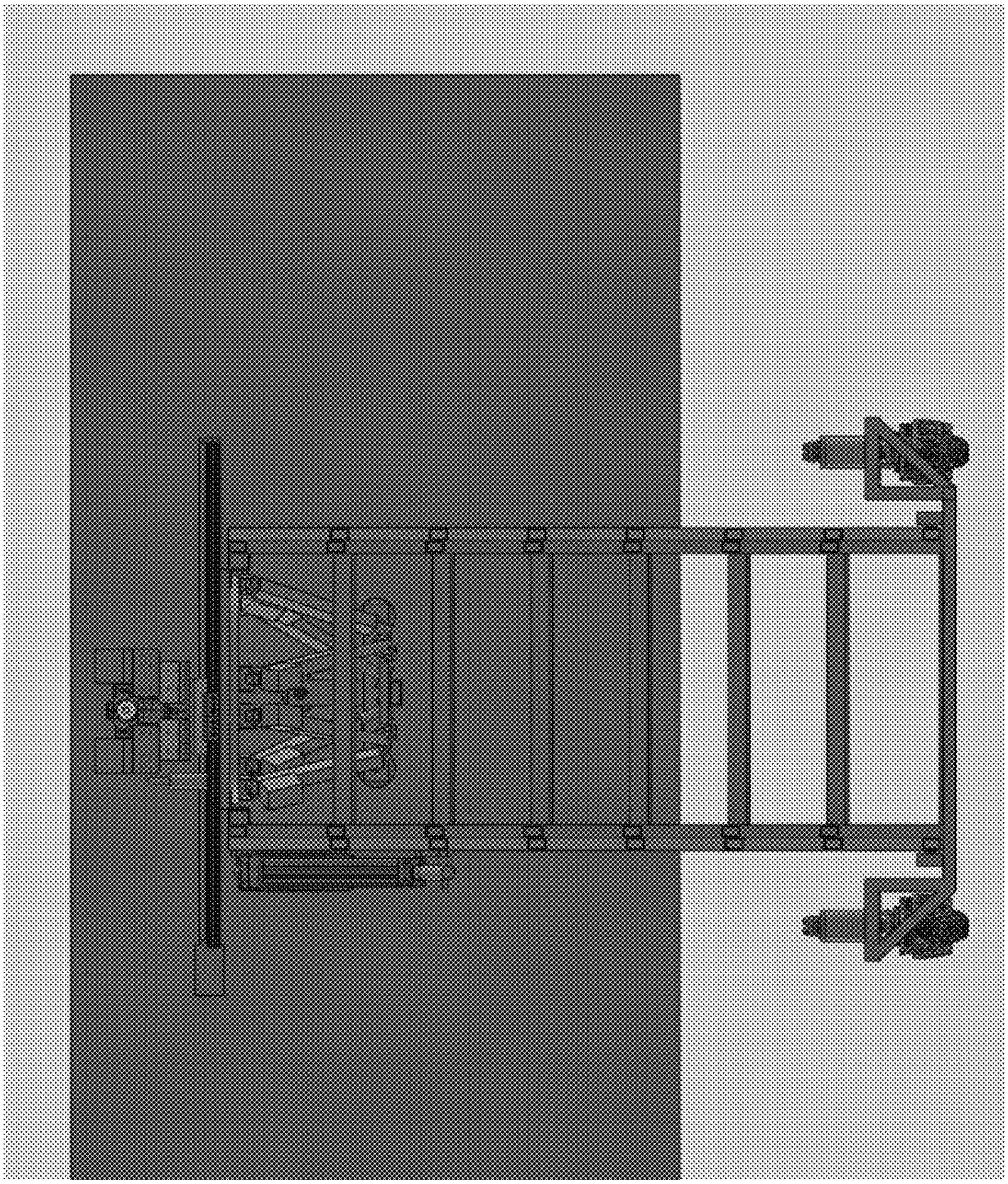

As may be understood from FIGS. 3 and 5, ahead of the shaft coupler is a mechanism to detach the Phillips bit. This mechanism when moved forward allows for the bayonet style shaft of the Phillips bit to be removed. In some embodiments, to allow for variable speed operation with the ability to reverse direction, brushless motors are driven with a BLDC motor controller.

In various embodiments, the screw gun assembly includes one or more linear motion slide actuators (shown in FIG. 5). The screw gun assembly may move forward toward the wall using a pair of linear motion slide actuators. These slide actuators (or thrust actuators), may be moved forward in concert, thereby pushing the screw gun assembly toward the wall. The actuators may be stepper controlled to allow for variable speed and direction.

Figure 2:
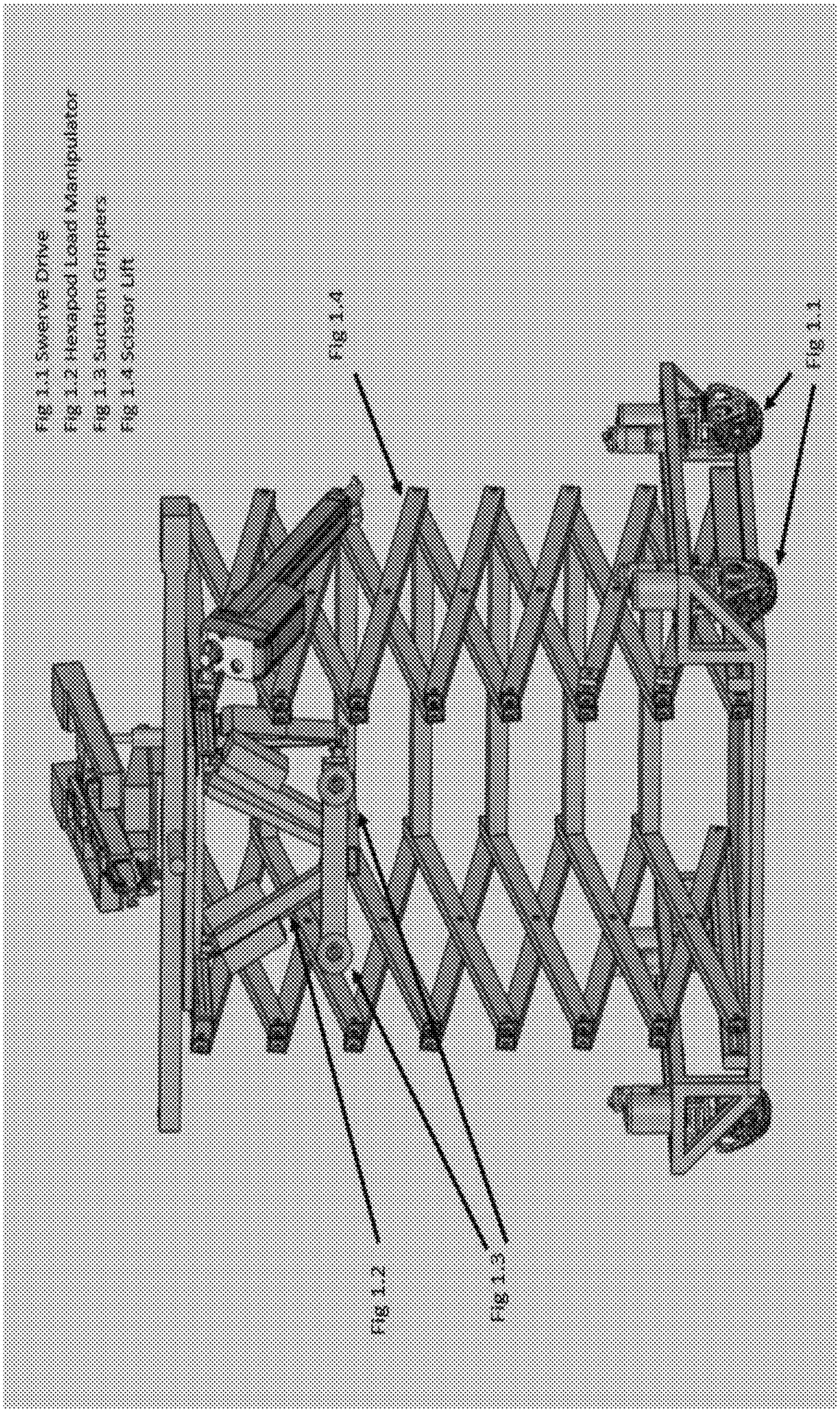
FIG. 2. depicts the semi-automated sheetrock robot with screw-gun apparatus of FIG. 1, with the semi-automated sheetrock robot in an extended position.

In particular embodiments, the screw gun assembly is connected to the thrust actuators by a pair of compression springs (FIG. 2.5), e.g., two or more compression springs. These springs may be used to absorb the pressure seen at the tip of the screw, allowing time for the screw to drill itself into the sheetrock and stud. Also, in the event the screw binds or hits a surface which it cannot penetrate, the compression springs may absorb the forward motion of the thrust actuators. The compressions springs may also be used to keep a consistent pressure at the tip of the screw gun bit. As may be understood from FIG. 4, the combination of the screw gun and thrust actuator assemblies may be mounted on a rotational base. Operation of the rotational base (e.g., via one or more motors) may allow for the screw gun to be pointed and angled into corners, or any other suitable position independent of the load manipulator. In this way, the screw gun assembly may be configured to drive a screw through sheetrock in any desired orientation relative to the sheetrock, as the sheetrock is held in any desired orientation relative to the lift assembly (e.g., or a wall) by the load manipulator, such that the orientation of the screw gun and sheet rock are independently manipulable.

In still further embodiments, the screw gun assembly includes a tilting mechanism (FIG. 4) that may be mounted under the rotational base to allow for +/−25 degree angle changes in a vertical orientation. This may allow for screws to be inserted into the top and bottom corner seams of the sheetrock. It may also be used to correct misalignments caused by shifts in supporting mechanisms.

Figure 4:
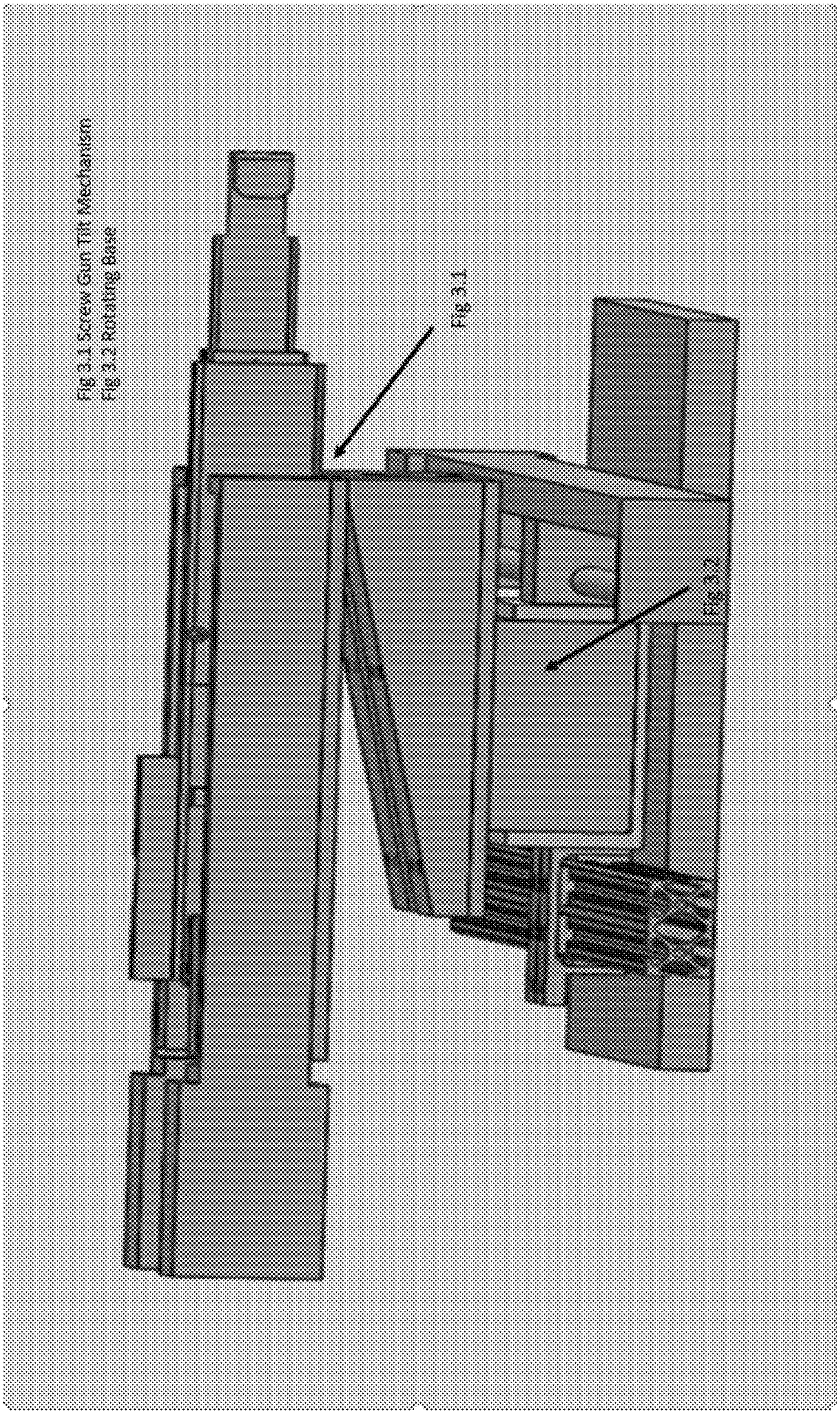
FIG. 4 depicts a side view of the screw-gun apparatus of FIG. 3 disposed on a tilting mechanism.

In further embodiments, o allow for the lateral movement of the screw gun assembly, an additional linear slide actuator or lateral actuator is included in the screw gun apparatus (FIG. 4.1). Operation of the lateral actuator(s) may allow the screw gun to move left or right relative to the sheetrock's surface (e.g., while the load manipulator is holding the sheetrock).

In a particular embodiments, a sheetrock contact sensor (e.g., optical sensor) is disposed at the top of the Screw Gun assembly (FIG. 2.4), which may, for example, be used to detect the position (depth) of the screw gun. This sensor may detects an initial contact with the wall surface sending the information back to a host computer or other suitable computing hardware (e.g., computing processor(s)). In particular embodiments, at the backend of the compression springs is an additional opto sensor (FIG. 2.1) to detect over-travel/over-pressure of the screw gun assembly.

In a particular example, an automated solution for attaching sheetrock to a studded wall may need to be able to move left to right, up and down, angle into corners, and adjust automatically to varying thicknesses of the material. It may also need to locate the studs behind the sheetrock being attached. Once the stud is located the screw gun may need to detect the wall (sheetrock) surface, and drive the screw through the sheetrock into the studs.

In various embodiments, a preferred speed to set a typical drywall screw may be around 750-1500 RPM. In some embodiments, it may be necessary to vary the screw gun's speed as the screw enters into different layers of materials (metal stud, wood stud, sheetrock, etc.). As such, in various embodiments, a variable/reversible high-speed brushless motor with a may be utilized to automatically modify torque of the screw gun based on compression of the compression springs (e.g., which may be detected in any suitable manner).

In some aspects, after the sheetrock is positioned into place by the load manipulator a, capacitive sensor may make contact with the surface of the sheetrock. Once contact is made, the screw gun lateral actuator may move the capacitive sensor Left and Right in search of a stud. When the stud is located, this information is sent back to the sheetrock robot's controller.

Once a stud is located, the robot's controller may signal the thrust actuator to move forward toward the sheetrock's surface. When the screw gun touches the surface of the sheetrock an opto sensor detects contact, turns the motor on, and advances the screw bit into the sheetrock at a slower initial predetermined speed. In some embodiments, a controller may modify the speed of the trust actuator in moving the screw gun toward the sheetrock based on compression of the compression springs in order to maintain a desired rate of approach and pressure one the screw gun begins to drive the screw.

In various embodiments, as the screw gun drives the screw into the stud through the sheetrock, the system receives compression data from the compression screws. A controller may then modify at least one of: (1) the rate of the thrust actuators moving the screw gun toward the sheetrock; and/or (2) the torque and/or rotation speed of the screw gun. The controller may modify either or both of these in response to a change in compression. For example, as compression increases, the controller may increase the rate at which the thrust actuators move the screw gun toward the sheet rock, and/or increase the RPMs of the screw gun.

When the compression spring(s) sensor detects movement (i.e., cause by a change in density of the material through which the screw is travelling) this means the screw gun has reached the stud. At this point, the speed of the screw gun motor is increased (e.g., by suitable computing hardware, controller, etc.) allowing for the screw to drill through the stud. Forward motion is maintained while compression strings located on both sides of the screw gun allow for a constant pressure to be applied to the stud.

As the screw cuts into the stud, it pulls itself in until the maximum depth is achieved, which is preset with the screw depth adjustment. Once the screw is set, an end-of-travel opto limit sensor detects the setting of the screw. The computing hardware, in response, turns off the drive and reverses the thrust actuator to move the screw gun away from the sheetrock.

The screw gun may then signal the robot's controller that the screw is in place and moves onto the next location by either calculating a 16 or 24 inch stud center, or redeploying the screw gun capacitive sensor sweeping to the next stud.

Conclusion

Many modifications and other embodiments of the invention will come to mind to one skilled in the art to which this invention pertains having the benefit of the teachings presented in the foregoing descriptions and the associated drawings. While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. For example, particular embodiments referring to certain components in various positions on the device may, in other embodiments, include other components described herein in any suitable combination.

In various embodiments, the assembly described herein may include any suitable computing hardware for receiving input from system sensors, or for causing or controlling operation of any components described herein (e.g., actuators, motors, screw guns, etc.).

Similarly, while operations are depicted in the drawings in a particular order, this should not be understood as requiring that such operations be performed in the particular order shown or in sequential order, or that all illustrated operations be performed, to achieve desirable results. Additionally, while some steps may be described as occurring in response to (e.g., or at least partially in response to) particular other steps, it should be understood that, in other embodiments, such steps may occur independent of (e.g., or coincident with) one another. In certain circumstances, multitasking and parallel processing may be advantageous. Moreover, the separation of various system components in the embodiments described above should not be understood as requiring such separation in all embodiments, and it should be understood that the described program components and systems may be generally integrated together in a single software product or packaged into multiple software products.

What is claimed is:

1. A screw-gun apparatus comprising:

a lift assembly;

a load manipulator disposed on the lift assembly, the load manipulator comprising a hexapod manipulator comprising at least one suction cup;

a vacuum system in communication with the at least one suction cup; and a screw gun disposed above load manipulator on the lift assembly, the screw gun comprising two compression springs disposed on opposing sides of the screw gun, the two compression springs being configured to apply a constant pressure between the screw gun and a wall stud as the screw gun screws a screw into the wall stud, wherein:

the lift assembly is configured to adjust a vertical position of the screw gun and the load manipulator;

the vacuum system is configured to cause the at least one suction cup to hold and maintain a piece of sheet rock as the screw gun screws the screw through the piece of sheet rock into the wall stud; and the load manipulator is configured to adjust an orientation of the piece of sheet rock while the at least one suction cup is holding the piece of sheet rock through modification of the hexapod manipulator.

2. The screw-gun apparatus of claim 1, further comprising a lateral actuator configured to modify a lateral position of the screw gun relative to the hexapod manipulator.

3. The screw-gun apparatus of claim 1, wherein the screw gun comprises a tilting mechanism configured to adjust a vertical angle of the screw gun relative to the load manipulator.

4. The screw-gun apparatus of claim 1, wherein the screw gun comprises a rotating base configured to adjust an orientation of the screw gun relative to the load manipulator.

5. The screw-gun apparatus of claim 1, wherein the screw gun comprises one or more slide actuators configured to adjust a distance of the screw gun from the wall stud.

6. The screw-gun apparatus of claim 5, wherein the one or more slide actuators are configured to slide the screw gun toward the wall stud at a desired rate.

7. The screw-gun apparatus of claim 1, wherein the screw gun apparatus is configured to cause the screw gun to drive the screw through the piece of sheet rock at a desired torque.

8. The screw-gun apparatus of claim 7, wherein the desired torque is determined based on a compression of the two compression springs.

9. The screw-gun apparatus of claim 7, wherein the desired torque comprises an initial torque and a second torque, wherein the second torque is triggered in response to detection of the compression of the two compression springs.

* * * * *